Figure 1:
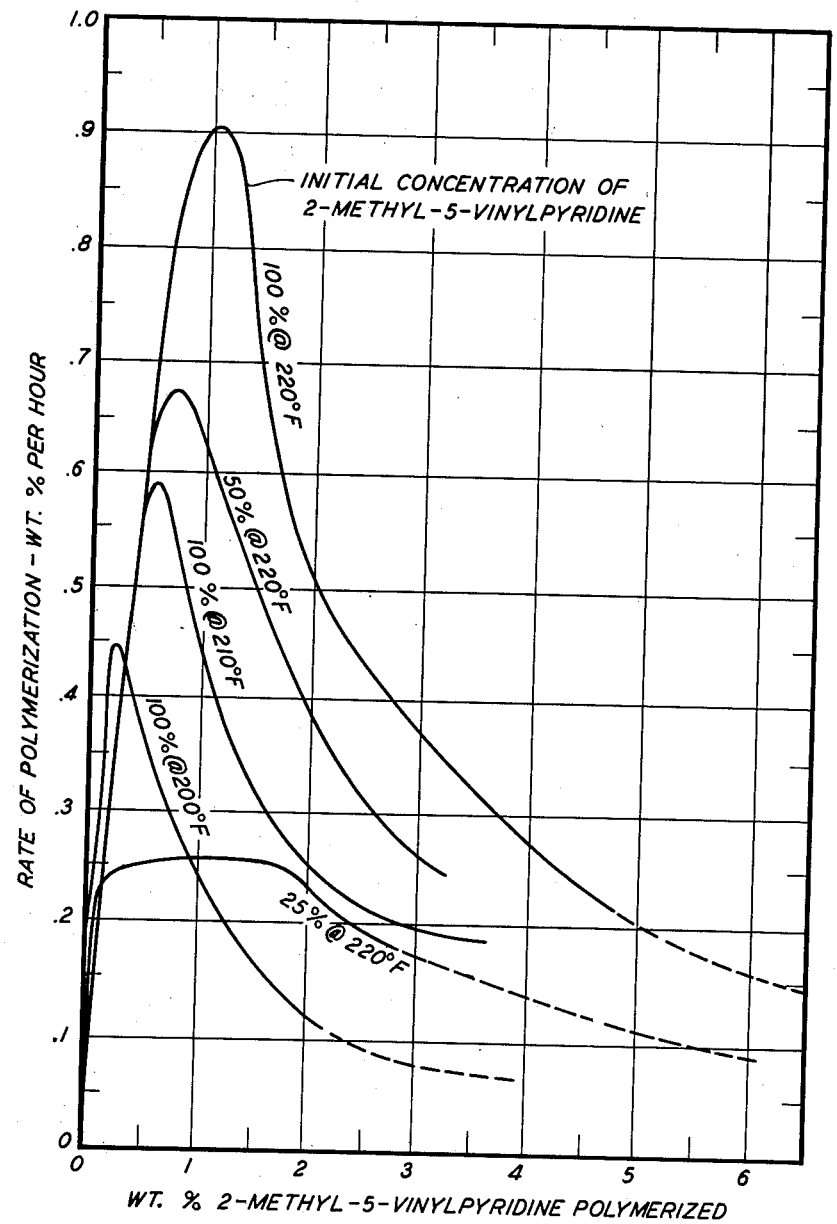

INVENTOR.
W. E. Burns

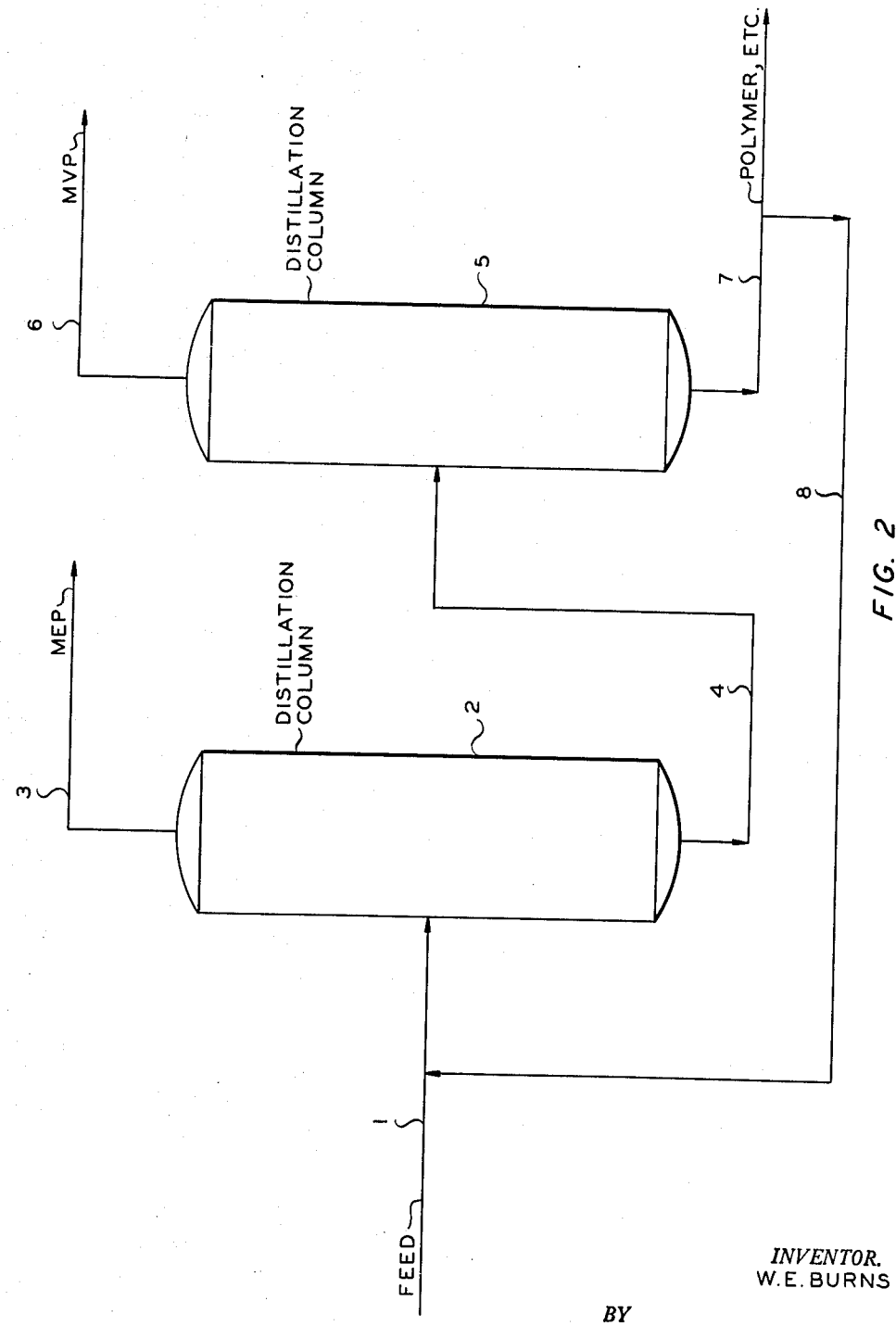

United States Patent Office 2,757,130
Patented July 31, 1956

2,757,130
PURIFICATION OF HETEROCYCLIC NITROGEN COMPOUNDS

William E. Burns, Pasadena, Tex., assignor to Phillips Petroleum Company, a corporation of Delaware Application November 3, 1952, Serial No. 318,488

7 Claims. (Cl. 202—52)

This invention pertains to the purification of polymerizable heterocyclic nitrogen compounds. This invention also pertains to the stabilization of vinyl-substituted heterocyclic nitrogen compounds. In one of its aspects the invention pertains to the purification of vinylpyridine compounds. In another of its aspects the invention relates to stabilization during purification of alkyl-substituted vinylpyridine.

It is known that difficulties are encountered in the manufacture of vinylpyridine compounds because of the tendency of these heterocyclic nitrogen compounds to polymerize upon exposure to elevated temperatures. For example difficulty is generally encountered in purifying vinylpyridine compounds by distillation due to their susceptibility to polymerization which results in the formation of an insoluble polymer within the fractionation column. In order to overcome this difficulty it is necessary to operate at low temperatures under high vacuum or in some way stabilize these pyridines against polymerization during distillation. One effective method of stabilization against polymerization during distillation involves the use of sulfur as disclosed in the application of Cary Wagner Serial No. 316,405, filed October 23, 1952. One desirable method of separating polymerizable heterocyclic nitrogen compounds employs a two step process. First the mixture of heterocyclic nitrogen compounds is distilled in a vacuum fractionator (a so-called "main fractionator") to produce a mixture containing from about 90 to 95 per cent polymerizable heterocyclic nitrogen compounds. The 90 to 95 per cent pure mixture of unsaturated heterocyclic nitrogen compounds is then conducted to a finishing still where a final separation is made. For example in the separation of 2-methyl-5-vinylpyridine from 2-methyl-5-ethylpyridine and lighter materials, the mixture can be distilled in a combined steam-vacuum unit operated with a top tower pressure of 100 millimeters' mercury absolute. Sufficient steam is added to the unit to maintain a temperature of 185° F. in the kettle. The 2-methyl-5-vinylpyridine along with some polymeric material is withdrawn at the bottom of the unit. This vinylpyridine compound can be store if desired but generally is taken to a finishing still where it is finally fractionated to recover at least 95 per cent pure methylvinylpyridine as overhead product.

When sulfur is employed as a stabilizer or polymerization inhibitor it can be introduced to the main fractionator with the feed mixture. The polymerizable heterocyclic nitrogen compounds which are inhibited in my process have the characteristic structure according to the formula

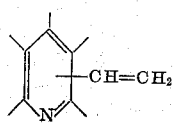

A desirable and effective method of introducing sulfur to the main fractionator for the inhibition of polymerization is to add sulfur to the reflux. The sulfur then passes through the main fractionator and out with the bottoms product. As described in the Cary Wagner application Serial No. 316,405, from 0.01 per cent to 1.5 per cent by weight of sulfur is used to inhibit polymerization during distillation and storage.

Sulfur, although desirable as an inhibitor of polymer formation, does not, of course, completely prevent the formation of soluble polymer. As disclosed in the Wagner application a small percentage polymerizes at 185° F. even in the presence of sulfur. Quite surprisingly, however, I have discovered that the formation of polymers can be even further minimized in a distillation wherein sulfur is used by recycling the residue or bottoms product containing soluble polymer from the finishing still to the main fractionator. Any insoluble polymer formed can, of course, be removed first. The recycled polymeric material can then be mixed with the feed to the main fractionator, or it can be introduced at any point along the column. At temperatures in the range of 200° F. to 220° F. the rate of polymerization increases sharply until one or two per cent of the vinylpyridine has polymerized. This rate then decreases rapidly as more polymer is formed.

This invention can be more fully explained by reference to the accompanying drawings.

In the accompanying Figure 1 are curves wherein the weight per cent of 2-methyl-5-vinylpyridine polymerized is plotted against the rate of polymerization.

The data from which the accompanying curves were plotted were obtained by finding per cent polymerization when sulfur is used as an inhibitor. The extent of polymerization of 2-methyl-5-vinylpyridine (MVP) under various conditions was determined by heating samples in an oven at a specific temperature for the desired period, and then measuring the percentage of the MVP polymerized. Immediately before each concurrent series of tests, the MVP to be used was subjected to a simple vacuum distillation to remove any polymer, inhibitor, or other impurity present. An inhibitor was added, and three-milliliter samples were placed in five-milliliter capsule vials. To simulate conditions in the distillation column, where no air would be present, the vapor space in each vial was carefully flushed with nitrogen, which had been bubbled through oxsorbent to remove traces of oxygen, and the screw cap was tightened in place. The cap was fitted with a hycar rubber lining which was covered with aluminum foil to prevent attack by MVP vapors. Vials containing the MVP were placed in the oven for the designated period of heating, and samples were then removed for polymer analysis. In the analysis, weighed, two milliliter samples were placed in 40-milliliter capsule vials; the vials were connected by rubber stoppers to a vacuum manifold in which the pressure was less than one millimeter mercury; and the monomer in the sample was vaporized by heating the vials in a boiling water bath. The vaporization was continued until a constant weight of polymeric residue was observed.

The data obtained as described above were weight per cent polymerized at the end of one, two, three, five, and eight hours using sulfur (S) as follows. The 50 and 25 per cent solutions contained 50 and 75 per cent 2-methyl-5-ethylpyridine (MEP) respectively.

MVP–MEP Solutions

| Temperature (° F.) | 220 F | 220 F | 220 F | 220 F | 220 F | 210 F | 200 F |
|---|---|---|---|---|---|---|---|
| Composition of Sample | 100% MVP | 50% MVP | 50% MVP | 50% MVP | 25% MVP | 100% MVP | 100% MVP |
| Inhibitor | 0.1% S | 0.1% S | 0.1% S | 0.1% S | 0.1% S | 0.1% S | 0.1% S |
| 1 Hr | 0.39 | 0.34 | 0.01 | 0.25 | 0.11 | 0.25 | 0.21 |
| 2 Hr | 1.10 | — | 0.47 | 0.54 | 0.67 | 0.67 | 0.65 |
| 3 Hr | 1.80 | 1.05 | 0.78 | 0.95 | — | 1.11 | 0.83 |
| 5 Hr | 2.71 | — | 1.82 | 1.89 | 1.29 | 1.72 | 1.38 |
| 8 Hr | 3.77 | 2.34 | 2.76 | 2.91 | 2.01 | 2.94 | 1.76 |
| Blank | 0.10 | 0.20 | 0.10 | 0.13 | 0.08 | 0.15 | 0.16 |

From these data a curve can be drawn showing weight per cent polymerized versus time. Then by taking the slope of this curve at various time intervals to obtain instantaneous rates of polymerization the curves shown in the accompanying figure can be obtained by plotting the instantaneous rates (slope) against weight per cent of polymer formed at these rates.

Referring now to Figure 1, the curves shown that after a modicum of soluble polymer forms the rate of polymerization decreases. In accordance with this invention, therefore, soluble polymer is recycled so that this modicum is always present, the rate of polymerization is thereby decreased and further polymer formation is minimized. Referring again to the curve, as an example, when 100 per cent 2-methyl-5-vinylpyridine is heated to a temperature of 220° F., the rate of polymerization increases sharply. When soluble polymer is recycled to bring the concentration of said polymer to 2 per cent by weight based on the vinylpyridine, further polymerization of the initial 100 per cent vinylpyridine will take place slowly based on the curve. The curves show that the same is true at other temperatures and concentrations.

The quantity of soluble polymer recycled to further minimize the formation of said polymer in accordance with this invention will, as shown by the curves discussed, depend somewhat upon the temperature employed and on the amount of saturated component present. The amount of soluble polymer recycled will, of course, be sufficient to further inhibit polymerization, e. g. from 0.1 per cent to 15 per cent polymer by weight based on the polymerizable heterocyclic nitrogen compound present. Figure 2 is a flow sheet illustrating diagrammatically one manner of practicing the instant invention. It is to be understood that Figure 2 is merely for illustrative purposes and to facilitate an understanding of one embodiment of my invention, and it is in no way to be construed as unnecessarily limiting the scope thereof.

A mixture of 2-methyl-5-vinylpyridine (MVP) and 2-methyl-5-ethylpyridine (MEP) is introduced into distillation column 2 via conduit 1. Sulfur is employed as a stabilizer or polymerization inhibitor and can be introduced into distillation column 1 with the feed mixture or it can be added to the reflux (not shown). Approximately 0.01 to 1.5 per cent by weight of sulfur based on the MVP is added to inhibit polymerization. The temperature of the bottom of said column is maintained at approximately 185° F. and the upper portion of the column is operated under a pressure of about 100 mm. mercury absolute. MEP is withdrawn as an overhead product and MVP along with polymeric material and sulfur is withdrawn at the bottom of the unit. The bottoms product is introduced into a second distillation column 5 (finishing still) via conduit 4 wherein MVP is recovered as the overhead product and polymeric material, heavy pyridines, and tars are removed as bottoms via line 7. A portion of the bottoms product from the second distillation column is recycled to the first distillation column.

Obviously the foregoing descriptions are intended to be illustrative of the invention only, and many different embodiments can be carried out without departing from the spirit and scope thereof.

I claim:

1. In the process for separating a readily polymerizable heterocyclic nitrogen compound containing a sole pyridine ring from a closely boiling non-polymerizable heterocyclic nitrogen compound containing a sole pyridine ring wherein this mixture of heterocyclic nitrogen compounds is initially distilled with sulfur present as a polymerization inhibitor, and the polymerizable hetrocyclic nitrogen compound and polymer formed are withdrawn as bottoms product and further distilled to recover the polymerizable nitrogen compound, the improvement which comprises recycling soluble polymer withdrawn during said further distillation to said initial distillation in an amount sufficient to further inhibit polymerization during said initial distillation.

2. In the process wherein an alkyl substituted-vinyl-pyridine is separated from an initial mixture containing a closely boiling alkyl substituted-pyridine by distilling said mixture of pyridines under vacuum in the presence of from 0.01 per cent to 1.5 per cent sulfur by weight based on the alkyl substituted-vinylpyridine, withdrawing as bottoms the alkyl substituted-vinylpyridine, sulfur, and any polymer formed, and further distilling said bottoms to recover the alkyl substituted-vinylpyridine, the improvement which comprises recycling soluble polymer from said further distillation to the vacuum distillation step in an amount of from 0.1 per cent to 15 per cent by weight of polymer based on said alkyl substituted-vinylpyridine.

3. In the process which comprises distilling under vacuum a mixture containing a vinylpyridine and an ethylpyridine in the presence of from 0.01 to 1.5 weight per cent sulfur based on the vinylpyridine, removing as bottoms product the vinylpyridine containing sulfur and polymer formed during said vacuum distillation, and subsequently distilling said bottoms product to remove the vinylpyridine overhead and to form as bottoms a residue having therein sulfur and any polymer formed during said distillations, the improvement which comprises recycling said bottoms residue in an amount of from 0.1 to 15 per cent by weight based on the vinylpyridine in said mixture, from said subsequent distillation to said vacuum distillation.

4. A process for purifying 2-methyl-5-vinylpyridine prepared by the catalytic dehydrogenation of 2-methyl-5-ethylpyridine which comprises distilling under vacuum and with reflux a mixture of reaction products resulting from said dehydrogenation process, during said distillation continuously adding sulfur to the reflux in an amount of from 0.01 per cent to 1.5 weight per cent based on the vinylpyridine, withdrawing as bottoms product 2-methyl-5-vinylpyridine containing sulfur, soluble polymer and any insoluble polymer formed during said fractionation, removing insoluble polymer formed, subsequently distilling said bottoms product in a final distillation column, recovering overhead at least 95 per cent pure 2-methyl-5-vinylpyridine, recovering as bottoms a residue containing soluble polymer, insoluble polymer and sulfur, removing insoluble polymer, and recycling said bottoms residue from said subsequent distillation to said vacuum fractional distillation in an amount of from 0.1 to 0.15 per cent by weight based on the 2-methyl-5-vinylpyridine in said mixture of reaction products from said dehydrogenation process.

5. A process for reducing the rate of polymerization of 2-methyl-5-vinylpyridine in a fractional distillation of a mixture of 2-methyl-5-vinylpyridine and 2-methyl-5-ethylpyridine which comprises fractionally distilling said mixture in the presence of from 0.01 to 1.5 weight per cent sulfur based on the 2-methyl-5-vinylpyridine, thereby forming as bottoms 2-methyl-5-vinylpyridine, polymers of 2-methyl-5-vinylpyridine and sulfur, and adding said polymers to said mixture being fractionally distilled.

6. In the process for separating a readily polymerizable heterocyclic nitrogen compound having the characteristic structure according to the formula

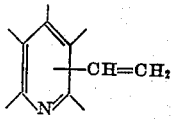

from a closely boiling non-polymerizable heterocyclic nitrogen compound wherein the mixture of heterocyclic nitrogen compounds is initially distilled with sulfur present as a polymerization inhibitor, and the polymerizable heterocyclic nitrogen compound and polymer formed are withdrawn as bottoms product and further distilled to recover the polymerizable nitrogen compound, the improvement which comprises recycling soluble polymer withdrawn during said further distillation to said initial distillation in an amount sufficient to inhibit polymerization during said initial distillation.

7. In a process for separating a readily polymerizable heterocyclic nitrogen compound containing a sole pyridine ring from a closely boiling nonpolymerizable heterocyclic nitrogen compound containing a sole pyridine ring wherein the mixture of heterocyclic nitrogen compounds is distilled with sulfur present as a polymerization inhibitor, and the polymerizable heterocyclic nitrogen compound and polymer formed are withdrawn as bottoms product, the improvement which comprises recovering said polymer from said bottoms product and recycling said polymer to said mixture being distilled in an amount sufficient to further inhibit polymerization of said mixture.

References Cited in the file of this patent

UNITED STATES PATENTS

| | | |
|---|---|---|
| 1,768,434 | Polaikie | June 24, 1930 |
| 2,181,102 | Stoesser | Nov. 21, 1939 |
| 2,512,660 | Mahan | June 27, 1950 |
| 2,534,285 | Mahan | Dec. 19, 1950 |
| 2,556,845 | Kauffman | June 12, 1951 |
| 2,611,769 | Hays | Sept. 23, 1952 |

FOREIGN PATENTS

| | | |
|---|---|---|
| 695,098 | Germany | Aug. 16, 1940 |